United States Patent [19]

Solinov et al.

[11] Patent Number: 5,456,372
[45] Date of Patent: Oct. 10, 1995

[54] IMPACT RESISTANT LAMINATED WINDOWS MANUFACTURE

[75] Inventors: Vladimir Solinov; Igor Boguslavski, both of Moscow, Russian Federation

[73] Assignee: Flachglas Intg Glasveredelungs GmbH, Germany

[21] Appl. No.: 343,996

[22] Filed: Nov. 18, 1994

Related U.S. Application Data

[63] Continuation of Ser. No. 105,949, Aug. 13, 1993, abandoned.

[30] Foreign Application Priority Data

Aug. 15, 1992 [DE] Germany .......................... 42 27 050.2

[51] Int. Cl.$^6$ .............................. B44C 1/22; C03C 15/00; C03C 25/06
[52] U.S. Cl. .............................................. 216/34; 216/97
[58] Field of Search .................................. 216/33, 34, 97, 216/99; 65/31; 156/109

[56] References Cited

U.S. PATENT DOCUMENTS

| 3,711,263 | 1/1973 | Leger ........................................... 65/31 |
| 3,718,535 | 2/1973 | Armstrong et al. ................. 156/106 X |
| 3,799,817 | 3/1974 | Van Laethem .......................... 156/663 |
| 3,816,201 | 6/1974 | Armstrong et al. ..................... 156/106 |
| 3,916,074 | 10/1975 | Knackstedt et al. ..................... 428/425 |
| 4,121,014 | 10/1978 | Shaffer ..................................... 428/412 |
| 4,732,944 | 3/1988 | Smith, Jr. ............................. 525/329.9 |
| 5,100,452 | 3/1992 | Dumbaugh ................................... 65/23 |

FOREIGN PATENT DOCUMENTS

| 1704624 | 7/1977 | Germany . |
| 214028 | 4/1972 | Netherlands . |
| 320992 | 1/1972 | Russian Federation . |
| 367942 | 3/1963 | Switzerland . |
| 1359165 | 7/1974 | United Kingdom . |

OTHER PUBLICATIONS

Kurkijan, Charles R. of AT&T Bell Laboratories—"The Effect of Etch Depth on Strength of Indented Soda Lime Grass Rods," Plenum Press, New York and London,© 1985, p. 185 et seq.

Proctor, B.—"The Effects of Hydrofluoric Acid Etching on the Strength of Glasses", Physics and Chemistry of Glasses, vol. 3, No. 1, Feb. 1962.

Bogulavski et al—"Supporting Capacity of Glass Shells Strengthened by Etching Under the Action of Uniform External Pressure and Bending Moments," translated from Problemy Prochnosti, No. 5, pp. 67–70, May 1984.

Kurkijan, Charles R. of AT&T Bell Laboratories—"Surface Chemistry in Relation to the Strength and Fracture of Silicate Glasses," Plenum Press, New York and London, ©1985, p. 37 et seq.

Ullman, D. R. and Kreidle, N. J.—Glass Science and Technology, vol. 5, Elasticity and Strength in Glass, Academic Press 1980, Chapters 4 and 6.

*Primary Examiner*—William Powell
*Attorney, Agent, or Firm*—Howrey & Simon

[57] ABSTRACT

A component for a laminated window, the component comprising a glass sheet having an etched hydrated surface and a protective layer of plastics material covering the etched surface, the protective layer being selected so as to be bondable to a plastics interlayer material. The invention also provides a laminated window including a first ply comprising a glass sheet having an etched hydrated surface and a protective layer of plastics material covering the etched surface and a second ply to which the first ply is bonded by a plastics interlayer, the material of the interlayer and of the protective layer being selected so as to be bondable together. The present invention further provides a method of producing a pre-product glass sheet having improved bending strength.

11 Claims, 2 Drawing Sheets

IMPACT RESISTANT LAMINATED WINDOWS MANUFACTURE

This application is a continuation of application Ser. No. 08/105,949, filed on Aug. 13, 1993, abandoned.

BACKGROUND TO THE INVENTION

The invention relates to impact resistant laminated windows and their manufacture. In particular, the invention relates to a method of producing a pre-product glass sheet from a tempered or non-tempered glass sheet substrate, which, acting as a component which increases the impact strength of a laminated glass window having at least one synthetic resin bonding layer, is adapted to be integrated into the laminated glass window. The invention also relates to a laminated glass window comprising at least one pre-product glass sheet made by the method.

In this specification the term "impact strength" denotes the strength with respect to pulsating, striking or knocking stresses. These include impacts by bullets stones or other hard objects on a window. In the context of the invention, the term also covers bending stresses and, more particularly, locally limited bending stresses which take place at high speeds of deformation and result from a large bending pulse. These includes stresses which aircraft windows are subjected to on collision with birds. In the context of the invention the term "synthetic resin" is not restricted to the definition of DIN 55958 (1988). It also includes the plastics listed in the description and in the claims and other plastics usable in the context of the invention (cf. Römpp "Chemie Lexikon" 1990, 2398 ff.).

It is known from DE-A-2223316 (and its equivalent GB-A-1359165) to subject the surface of at least one of the glass sheets in a laminated glass window to what is known as. rectification, to eliminate surface faults and inhomogeneity and thus improve the strength and, more particularly, the impact strength of the glass sheet. For this purpose it has also been proposed to carry out an- etching operation on at least one of the surfaces. Tests have shown that there is no guarantee of any appreciable reproducible improvement in strength, and particularly impact strength, of the laminated glass window.

In order to increase the bending strength of sheet glass it is also known (CH-PS 367 942, US 37 11 263) to etch away one or both surfaces of a non-tempered or tempered glass sheet by means of an etching liquid, the etch depth having for example a thickness of 30 μm or more. The specifications disclose the provision of the etched surface or surfaces with a thin protective inorganic layer, e.g. a silica protective layer. The Swiss specification discloses that optimal strengthening may be achieved by thermal treatment of the glass directly after etching and before provision of the inorganic protective layer. This protective layer is applied in order to improve the resistance of the glass to sudden temperature changes and to improve the tensile strength. The protective layer may be replaced by a thin glass layer. An improvement in strength is alleged to be obtained in this way. Tests, however, show that even these known steps do not give a reproducible improvement in impact strength. This is because these known processes give a wide variation from sheet to sheet of the strengths obtained.

SUMMARY OF THE INVENTION

The present invention aims to provide a method of producing a pre-product glass sheet from a tempered or non-tempered glass sheet substrate, the said pre-product glass sheet reproducibly (in contrast to the prior art) resulting in a considerable improvement in the measured bending strength and, particularly, impact strength. The present invention also aims to provide an impact resistant laminate incorporating such a pre-product glass sheet.

The present invention provides a method of producing a pre-product glass sheet from a tempered or non-tempered glass sheet substrate, which, acting as a component which increases the impact strength of a laminated glass window having at least one synthetic resin bonding layer, is adapted to be integrated into said laminated glass window, the method comprising the steps of: (a) etching at least one face of the glass sheet substrate to produce a virgin surface which comprises silanol groups; (b) cleaning the virgin etched surface by washing; (c) removing mobile water from the cleaned virgin surface by a drying treatment, the silanol groups being retained; and (d) applying a protective layer to the dried surface which adheres firmly to the surface, the protective layer being composed of a plastics material which is adapted to be compatibly adherable to a synthetic resin bonding interlayer.

The present invention also provides a laminated window having improved impact strength, comprising a glass sheet as the outer sheet and at least one connecting sheet combined with the outer sheet by way of an organic bonding interlayer, at least one of the sheets being a pre-product glass sheet produced by the method of the present invention and wherein the protective layer of the at least one pre-product glass sheet is adhered to any adjacent sheet by the bonding interlayer, the materials of the protective layer and of the bonding interlayer being compatibly adherable together.

The present invention further provides a component for a laminated window, the component comprising a glass sheet having an etched hydrated surface and a protective layer of plastics material covering the etched surface, the protective layer being selected so as to be bondable to a plastics interlayer material.

The present invention still further provides a laminated window including a first ply comprising a glass sheet having an etched hydrated surface and a protective layer of plastics material covering the etched surface and a second ply to which the first ply is bonded by a plastics interlayer, the material of the interlayer and of the protective layer being selected so as to be bondable together.

The present invention is based on the results of research by the inventors which has revealed new opportunities for the use of high-strength etched glass panels in bonded laminates including at least one glass ply and one or more further glass and/or plastics plies bonded thereto. The possibilities of production of etched glass plates with a bending strength of around 1000–1500 $N/mm^2$ by treatment of the glass plates in etching solutions such as hydrofluoric acid for dissolution of the superficial glass layer having various dangerous defects are well known. However, up to the present invention, such glass plates were not used in bonded glass laminates since etched glass plates lose a considerable part of their strength because of mechanical and thermal vulnerability to damage of the surface.

BRIEF DESCRIPTION OF THE DRAWINGS

Embodiments of the invention will now be described by way of example only with reference to the accompanying drawings, in which.

DETAILED DESCRIPTION OF THE PREFERRED EMBODIMENTS

Figure 1:
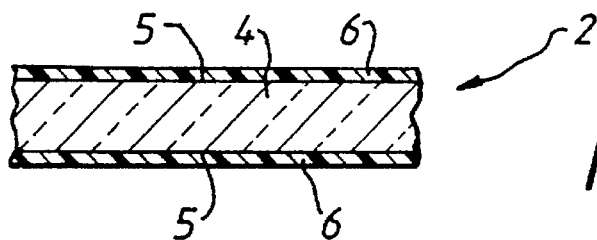
FIG. 1 is a schematic section (not to scale) of a pre-product glass sheet carrying protective layers accordance with the present invention.

FIG. 1 illustrates a pre-product glass sheet 2 manufactured in accordance with the method of the invention. The pre-product glass sheet 2 comprises a glass substrate 4 preferably of float glass which may have been chemically or thermally tempered. The glass substrate 4 has opposed etched surfaces 5 which have been etched in accordance with the method of the present invention as described hereinbelow and then each coated with a respective protective layer 6. As described hereinbelow, the protective layer 6 comprises a plastics material (described in greater detail below) which is connected to a synthetic resin bonding layer of a laminated window into which the pre-product glass sheet 2 is intended to be incorporated and adhered thereto by an organic bonding system. The etched surface 5 of the glass substrate 4 is sealed by the protective layer. The protective layer may have a thickness of from 0.5 to 50 microns or more, more preferably around 20 to 30 microns. The pre-product glass sheet of FIG. 1 is incorporated into the laminated window of FIGS. 3 and 4. In an alternative embodiment, the pre-product glass sheet may have been etched on only one side and has a protective layer on only one side. Such a pre-product glass sheet is incorporated in the laminated window illustrated in FIGS. 2 and 4.

The pre-product glass sheet has a bending strength in the range of from 600 to 2500 $N/mm^2$ The bending strength is selected depending upon the particular laminated window into which the pre-product glass sheet is incorporated. For aircraft applications, the bending strength is preferably from 1000 to 2000 $N/mm^2$.

Figure 2:
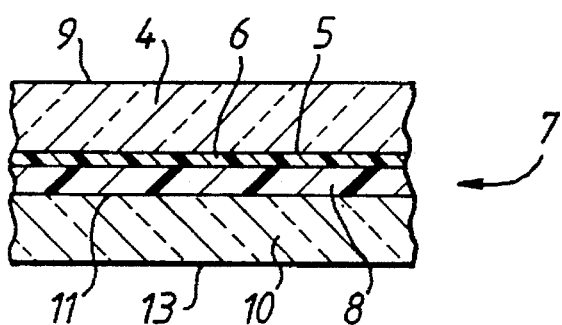
FIG. 2 is a schematic section (not to scale) through a laminated window made in accordance with a first embodiment of the, present invention.

Referring to FIG. 2, there is shown the pre-product glass sheet of FIG. 1, but having been etched on one side only and carrying only one protective, layer when incorporated into a multi-layer laminated window. The protective layer 6 is covered by a plastics bonding layer 8 which is adhered to a second sheet 10 of the combined laminate 7. The second sheet 10 may be composed of glass, for example, float glass and more particularly chemically tempered or thermally tempered glass. The total glass thickness may be about 4 mm for automotive use. The two glass sheets may have the same or different thicknesses. Alternatively, the second sheet 10 may be composed of a plastics sheet, for example, of polyacrylate, polymethacrylate, polycarbonate, polyester or polyurethane. The bonding layer 8 preferably is composed of the same plastics material, for example polyurethane or polyvinylbutyral, as the protective layer 6. In a particularly preferred embodiment, being in particular a laminated window for a motor vehicle, the glass sheet 4 is intended to be the outer sheet of the laminated window and is tempered and at the etched surface 5 of the sheet 4 the maximum bending strength is greater by a factor of at least 2 then the bending strength at the outer surface 9 of the glass sheet 4. The maximum bending strength at the surface 5 preferably constitutes the maximum bending strength of the entire laminated glass window 7. The inner sheet 10 preferably has on its bonding surface 11 and on its inwardly facing surface 13, bending strengths considerably less than the bending stress at the surface 5. More preferably, the outer sheet 4 may have a bending strength from 800 to 1000 $N/mm^2$ at the surface 5 and a bending strength in the range of from 300 to 500 $N/mm^2$ at the surface 9. The inner sheet 10 may have a bending strength in the range of from 300 to 500 $N/mm^2$ at the bonding surface 11 and at the inwardly facing surface 13. The bending strength may however be greater at the bonding surface 11 than at the inwardly facing surface 13 of the inner sheet 10. The bonding layer 8 preferably has a thickness of about 1 mm.

Figure 3:
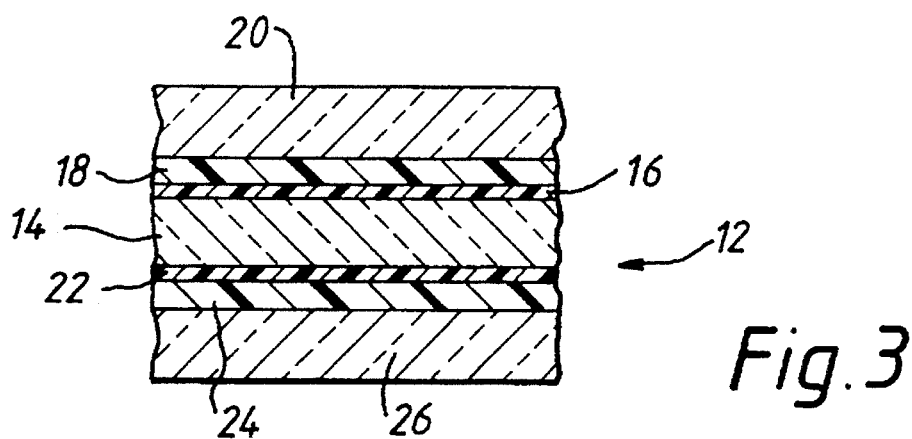
FIG. 3 is a schematic section (not to scale) through a laminated window in accordance with a second embodiment of the present invention.

A second embodiment of a laminated window in accordance with the present invention is illustrated in FIG. 3. In this embodiment, a laminated window 12 comprises a pre-product glass sheet consisting of a central ply 14 of glass which has been etched on both sides thereof and is coated on both etched surfaces by opposed protective layers 16,22, similar to the protective layer 6 of the embodiment of FIG. 1. Each protective layer 16,22 is bonded to a respective inner and outer ply 20,26 by a respective bonding layer 18,24. The inner and outer plies 20,26 and the bonding layers 18,24 may have the same construction and composition as the second ply 10 and the bonding layer 8 respectively of the FIG. 2 embodiment. The inner and outer plies 20,26 may be of glass and/or rigid plastics. Thus in this embodiment, the pre-product glass sheet has been etched on both sides in accordance with the method of the present invention and then coated on both sides with a protective layer and then each of the two protective layers is bonded by a bonding layer to a further ply of the laminate. The laminated window may optionally be provided with one or more further glass or plastics plies bonded to the inner and/or outer plies.

Figure 4:
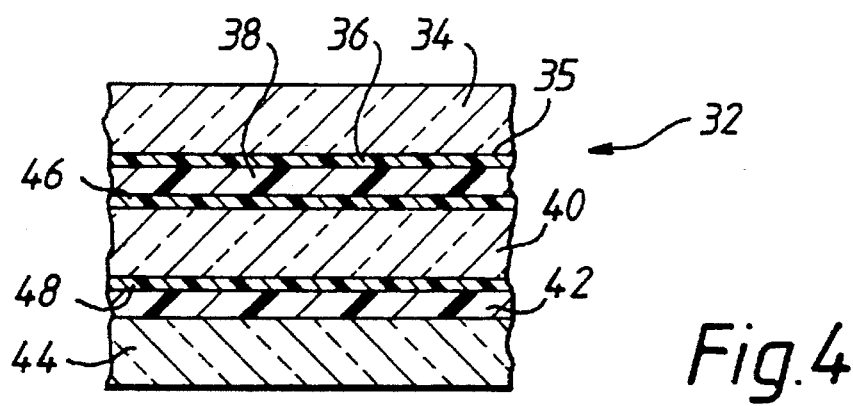
FIG. 4 is a schematic section (not to scale) through a laminated window in accordance with a third embodiment the present invention.

A third embodiment of a three-ply laminated window 32 in accordance with the present invention is illustrated in FIG. 4. In this embodiment, one pre-product glass sheet comprises the outer glass ply 34, carrying a protective layer 36, of the multi-ply laminate. The inward face 35 of the outer glass ply 34 has been etched and coated with the protective layer 36 which is then bonded by a bonding layer 38 to a middle ply 40 which comprises a further pre-product glass sheet having opposed protective layers 46,48. A further ply 44 of glass or plastics is adhered to the inner protective layer 46 on-the middle ply 40 by a bonding layer 42. More plies of the laminate may be provided for example being laminated to the further ply 44.

The embodiments of FIGS. 3 and 4 are particularly for use as aircraft windshields. Typically, each of the three plies is of glass and the total glass thickness is typically from 9 to 20 min. The intermediate and inner plies may both be pre-product glass plies made in accordance with the present invention.

The method of manufacture of the pre-product glass sheet and the laminated window structures will now be described in detail.

In accordance with the method of the invention, at least one surface of a glass sheet to be incorporated into a glass laminate is etched so as to remove defects such as microcracks. The sheet may be a float glass sheet, which may have been thermally or chemically strengthened.

Surfaces of glass sheets usually have defects which can reduce the strength of the glass sheet. The etch depth is advantageously greater than the defect depth so that the virgin etched surface is similar to that of an ideal glass surface just having been formed from molten glass without having been exposed to conditions causing defects in the surface. The etch depth is typically from 3 to 300 microns. Polishing acids with which an etching way operation can be carried out are extensively known. The main constituents may be hydrofluoric acid and/or sulphuric acid. The surface etching is carried out to produce a virgin surface comprising silanol groups (the expression "silanol groups" being used in the specification and claims to refer to hydroxy groups bonded to the glass surface, whether bonded directly to silicon atoms or otherwise). It is believed that, in addition to the silanol groups, the freshly etched surface so produced also contains molecules of water bonded to the surface and forming a hydrated surface layer, such hydration is believed to be responsible for the plasticity of the surface, and consequent high strength of the glass, and should be retained during the drying treatment.

Thus, in a preferred aspect of the invention, at least one face of the glass sheet substrate is etched to produce a hydrated surface layer including silanol groups, and the mobile water is removed from the cleaned virgin surface by a drying treatment, with a hydrated surface layer being retained.

The etched surface is washed immediately, for example with distilled water.

In the method of the invention, at least a proportion and preferably substantially all of the mobile water is removed from the washed etched surface by a drying treatment otherwise excess water may be present at the glass/protective layer interface after application of the protective layer, Mobile water denotes water which adheres on and to the surface cleaned by washing and which could be removed by a mechanical drying treatment, but, in the context of the invention, can also be removed thermally. The mobile water is minimised because this tends to decrease glass strength. After the drying treatment, which may be carried out thermally or chemically (for example by treatment with a non-aqueous solvent such as absolute alcohol) there remains in the silanol-group-comprising surface produced by the etching away operation, water which is retained as a result of higher binding forces of a physical and/or chemical nature (e.g. by adsorption and/or chemisorption). The drying treatment is carried out so that the (at least a substantial proportion of or preferably substantially all) silanol groups are retained. Moreover, at least a proportion and preferably substantially all of the water retained by higher binding forces should be retained in the drying treatment, as its loss would reduce the plasticity of the surface layer, by the formation of Si—O—Si bonds, shrinkage of the hydrated layer, loss of elasticity (brittlement) and the formation of microcracks.

Adsorption denotes binding with the forces conventional in the case of adsorption, for example hydrogen bonding. Chemisorption denotes the fact that molecules are fixed to the associated surface by way of chemical bonding, so that by chemisorption silanol groups retain water in the sense of hydration.

In order to protect the etched surface, a protective layer is applied to the etched, washed and dried surface. In this specification a glass sheet which has been etched, washed and dried and has then had a protective layer applied thereto is referred to as a "pre-product glass sheet" which can subsequently be incorporated into a glass laminate by being bonded to one or more further plies of the laminate by one or more bonding interlayers.

In order to obtain a defined improvement in the impact strength of a laminated glass window by integration of a pre-product glass sheet made in accordance with the invention, it is necessary to avoid mechanical damage to the pre-product glass sheet virgin surface produced by the etching-operation before the protective layer is applied. Even manual touching of the etched surface can lead to a reduction in strength of the ultimate laminate. In addition at least a proportion of the mobile water is removed in the drying step before the protective layer is applied. The impact strength of the laminated glass windows in which the pre-product glass sheets are incorporated can be defined and be very accurately reproducibly improved. Of course within the context of the invention the protective layer is also so applied as not to destroy the hydrated layer.

It has been shown that the thermal vulnerability to damage (decrease of the strength upon heating) of unprotected etched glass surfaces is explained by the change of the structure of the hydrated glass superficial layer upon heating because of loss of moisture adsorption from this layer. In the course of etching, hydrolysis of the siloxane bonds (—Si—O—Si ) takes place which results in formation of silanol groups Si—OH. It is known that these groups readily adsorb water molecules. Because of the micro-heterogeneous structure of the glass, the hydrolysis is effected in a non-uniform manner, thereby forming a loose gel-Like hydrated layer. Such a layer exhibits high micro-plasticity, a low microhardness which is about 60–80% (in a surface layer of up to 3 microns in thickness) lower than that of a non-etched glass surface, and low mechanical vulnerability to damage because of a high relaxation ability.

When the unprotected etched glass is heated to a temperature over about 100° C., the superficial layer begins to dehydrate which tends to lead to a loss of strength. This loss of strength increases with the increasing temperature and time of treatment. This results in a decrease of the strength of the etched glass and an increase of its vulnerability to damage. Even minor defects on the surface of such glass, as distinguished from etched glass which has not been heat-treated, cause the decrease of its strength by 5–10 times. When the etched glass is being heated, its strength is reduced without additional mechanical effects on the glass surface as well, which can be explained by shrinkage of the siliceous layer after desorption of moisture from the "gel-like" superficial layer, its compaction, formation of the tensile stresses and microdefects. Loss of strength takes place above a temperature of 100° C. and reaches a maximum rate at a temperature of 200° C. upwards. At a heating temperature of 200° C. the strength of the etched glass is reduced, for example (and depending on the heating time), from around 2000 to around 1000 N/mm$^2$ . It is evident from the above data that the etched glass (in the absence of a protective coating in accordance with the invention) would lose strength in a typical thermal laminating process in which glass plates are heated with interlayer films in an autoclave at relatively high temperatures (typically 140° C. and more) and pressures (up to 6–17 atm). The direct contact of the exposed surface of the etched glass with the bonding material as well as exposure of the glass to the pressure and temperature in the autoclave would cause the mechanical and thermal vulnerabiity of the etched glass to lead to damage of the glass surface and a sharp decrease in the strength of the laminate incorporating the etched glass.

In accordance with the invention, in order to decrease the loss of strength of the etched glass under such conditions, a protective coating is applied to the etched glass surface not only to protect the glass surface from mechanical defects on contact with interlayer under lamination conditions such as those described above, but also to control desorption (dehydration) of the superficial layer during glass bonding in the autoclave under temperature and pressure conditions as specified above. Of course, the protective layer must be so selected as not to be unacceptably damaged in the subsequent heat treatment, and should be applied under conditions which do not themselves result in an unacceptable loss of strength.

The protective layer must be of a composition which is compatible with the bonding layer so as to be able to bond sheets. Compatible means compatible in the sense of fusible, weldable or miscible whereby there is practically no impairment of the physical properties in the fusion weld or mixing zone. The protective layer must adhere to the glass surface and to the bonding interlayer. The protective layer must also have optical properties to make it suitable for use as an interlayer of a laminated window. Suitable materials for the protective layer which are adapted to be connected to the synthetic resin bonding layer by way of the material or which correspond thereto in terms of material, are known in practice. They consist of suitable plastics, e.g. polyvinyl butyral (PVB), polyurethane (PU) or silicone or mixtures thereof. Most preferably, the plastics material of the protective layer is the same as that of the bonding interlayer, although the materials may be different, for example a PVB or silicone protective layer may be used with a PU bonding interlayer. The tests required for selection of the materials and adjusting the parameters can be performed without difficulty in the light of the above instructions and give clear results.

The protective layer is preferably applied to the etched outer face immediately after drying of the surface, with the protective layer being deposited as a liquid, A solution containing the protective layer material may be deposited onto the etched surface by flow, spray or dip coating. The virgin etched, washed and dried surface, prior to the application of the protective layer, has not experienced any new damage and has no adverse changes in the course of time after the etching away operation. Preferably, the virgin etched surface comprising silanol groups does not have any impurities therein. The liquid preferably comprises the plastics material to form the protective coating in solution in a solvent.

The glass sheet carrying the protective coating may be heated so as to polymerise the coating and make it harder. Preferably, the temperature of this heating step is not greater than 200° C., more preferably not greater than 120° C., otherwise for reasons explained below, the strength of the laminated window can be reduced.

The protective layer is so selected as to adhere very tightly to the pre-product glass sheet and is intimately connected to the bonding layer without any strength impairment.

As will be shown by the examples, polyvinylbutyral (PVB) coatings with a relatively high content of plasticiser (up to 17%) are rather effective as protective coatings because coatings of this type possess the minimum water absorbing ability. It is known that PVB coatings are adhesively joined with the glass surface with the aid of the hydrogen bonds produced during interaction of the OH-groups of the coating and glass surface.

Some polyurethane coatings which chemically bind the OH-groups from the superficial layer prove to be even more effective as protective coatings. The use of such coatings enables the attainment of the maximum strength of the etched glass.

For manufacture of the laminated glass units, double-layer coatings with various functional groups can be applied to the-surface of the etched glass. For example, a silicone coating with amino groups can increase the thermal stability of the etched glass and has high adhesion to a polyurethane coating.

The pre-product glass sheet may then optionally be heat treated. This heat treatment may be required to polymerise the protective layer and/or to evaporate the solvent from the protective layer. The heat treatment affects the strength of the pre-product glass sheet. Diffusion processes probably take place during the concluding heat treatment and the protective layer absorbs water. The strength increase is all the more impressive, the lower the water absorption by the protective layer. After a heating step, there is a plasticised hydrated area at the interface of the glass with the protective coating. In this area it is believed that water may be bonded so as to inhibit diffusion therefrom into the coating. In PVB water is only hydrogen bonded therein and so the water can migrate through the PVB whereas in the PU the water tends to be chemically bonded therein. Thus the heating step is more appropriate for PVB coatings than for PU coatings because diffusion of water through the PVB on heating enables control of the amount of hydration in the plasticised area.

Surprisingly, in the heat treatment of the unit described, there is an abrupt improvement in strength as compared with the prior art if the heat treatment is so performed that the hydrated layer is not destroyed or at least not to any great degree. For this purpose, the temperature of this heat treatment must not be too high, or the treatment time too long.

Preferably, the steps of the method from the etching operation to the heat treatment after application of the protective layer are carried out immediately one after the other without interruption. For example, typically the protective layer is applied only minutes, e.g. about five minutes, after the etching operation. This assists in protecting the virgin etched surface without having acquired any mechnical or thermal damage. It is advisable to ensure that the etching away operation, the drying treatment and the heat treatment are carried out very uniformly with respect to the surface of the glass sheet substrate. In this way weak points or weakened areas are avoided in the laminated glass window in which the pre-product glass sheet is integrated. In a preferred embodiment, the drying treatment when effected thermally, is carried out at a temperature below 200° C., and especially below 120° C. Deposits of dust on the virgin surface may also have an adverse effect on the impact strength of the laminated glass windows. To obviate this, the drying and heating treatments should preferably be carried out in an environment which is as free from dust as possible, for example in very clean rooms. For the use of the pre-product glass sheet in a laminated glass window with a polyvinyl butyral or polyurethane intermediate layer, preferably a polyvinyl butyral or polyurethane protective layer respectively is applied to the virgin etched glass surface.

The resultant pre-product glass sheet, comprising the etched glass sheet carrying the protective layer on one or both sides is then used to form a laminated window by being bonded to one or more connecting glass or plastics plies by one or more bonding interlayers.

Preferably, the bonding system of the laminate is in all cases a synthetic resin bonding system, more particularly a polymeric synthetic resin conventional as an interlayer in multilayer laminates. Importantly, the protective layer is compatible therewith so that the bonding layer/protective layer combination adequately adheres the plies of the laminate together.

If a pre-product glass sheet made by the method according to the invention is incorporated in a laminated window, with the use of pressure and heat, care must be taken to ensure that the hydroxyl groups of the surface formed by the etching away operation are not destroyed. Preferably, the operation is so effected that the strength loss in no case exceeds 30%. Thus it is preferred that a laminating operation in which a first glass ply having an etched hydrated surface and a protective layer of plastics material covering that surface is bonded to a connecting sheet is carried out at a temperature below 130° C. and especially below 120° C.

Other sheets may be connected to the connecting sheet. The connecting sheets and other sheets may be glass sheets and/or plastic sheets. Of course, the laminate may incorporate one or more additional pre-product glass sheets made by the method according to the invention.

In known laminated windows, the breaking strength is determined by the mechanical strength parameters of the outer sheet and of the connecting sheet(s) and by the bond and the mechanical parameters of the bonding system. The known laminated windows usually have considerable impact strength in respect of pulsating, striking or knocking stresses. The known laminated windows are therefore used, inter alia, as laminated safety windows in motor vehicles and aircraft, both pressurised aircraft and unpressurised aircraft e.g. helicopters. When high impact strength is required, the usual steps result in a heavy mass of the window. Thus outer sheets and connecting sheets of relatively considerable thickness are used or at least the number of sheets is increased, the laminated window being constructed, for example, as a laminate of three or even more than three sheets. Of course thermal or chemical tempering of the individual glass sheets and the provision of special synthetic resin bonding systems contribute to the impact strength. These are more particularly polymer systems. This also applies to the protective layer.

The invention enables the production of a laminated window in which the impact strength is greatly improved, without changing its known construction in respect of glass and glass composition, stress state, and the thickness of the outer sheet and the connecting sheet and the possible thickness of other sheets connected thereto, for example thermally or chemically.

With regard to the laminated glass window, the invention is predicated on the fact that when a glass sheet is used with a virgin surface comprising silanol and other OH groups to which has been applied a protective layer, when the bonding system is attached the impact strength is greatly improved. The protective layer not only reduces the mechanical damage of the etched glass but also reduces the loss in strength due to environmental corrosion and high temperatures. The effectiveness of the various coatings depends on their composition and thermal treatment.

Preferably, in a laminated window made in accordance with the invention, the etched glass sheet carrying the protective layer is the outer or inner glass sheet of a multiple ply laminate. It may however be an intermediate sheet of the laminate. The laminate may incorporate two or more of the etched glass sheets carrying the protective layer.

The outer etched glass sheet may be a conventional non-tempered glass sheet, more particularly a float glass sheet. If a connecting sheet consists of glass, then that also applies to this sheet. According to a preferred embodiment of the invention, however, these sheets are tempered.

The application of the protective layer controls the escape of hydroxyls from the superficial layer of the etched glass by dehydration, thereby binding the hydroxyl groups, which prevents shrinkage of the superficial layer on heating, loss of strength and origination of the microcracks reducing the strength of the etched glass. It is also probable that some coatings prevent water sorption into the superfical layer of the glass from the environment, thereby decreasing the corrosive effect of water and reducing the degree of the loss of strength of the glass.

The laminated glass windows according to the invention may be used for the most diverse purposes where pulsating, knocking or striking stresses are expected. The laminated glass windows may be used as vehicle windows, for example aircraft windows having bird impact resistance or automobile windows having sufficient impact resistance to constitute an automobile windscreen. However, the laminated glass windows may also have bullet resistance so as to be suitable for use in security or military applications.

More specifically the invention relates in a particularly preferred aspect to a laminated glass window having a structure illustrated in FIG. 2, which is intended particularly for motor vehicles and in which the outer sheet and the second sheet bonded thereto are glass sheets. When used for motor vehicles, the outer sheet which faces the exterior has been strengthened by etching in accordance with the invention and has been bonded to the inner sheet by the protective layer/bonding layer combination.

Various laminated known glass windows intended particularly for motor vehicles have a high degree of symmetry in their construction. This applies in respect of the geometry and also in respect of the physical parameters and in respect of the inner and outer sheets per se. It also applies in respect of the organic bonding system and the arrangement of the outer and inner sheets with respect to the central plane of the laminated glass window overall. The mechanical strength of the known laminated glass windows, while being considerable, is open to improvement, more particularly as regards the impact strength. It is not normally desirable to produce the improvement by increasing the glass thickness, because it is current practice, particularly for use in motor vehicles, to reduce, not increase, the weight of windows. The same applies to other vehicles, e.g., aircraft.

With regard to the special use for vehicles, for example as a windscreen, the invention can improve the impact strength, without the remaining mechanical behaviour being impaired, of an asymmetrical laminated glass window of predetermined construction (predetermined glass composition and glass quality and predetermined sheet thickness), using simple steps which are adapted to large industrial mass production and which are readily integrated into an existing production line.

The invention in this aspect provides this technical advantage by the combination of the following features for automotive applications:

a) the outer sheet is tempered and has, at the inner bonding surface, the maximum bending strength with respect to the entire laminated glass window system, the bending strength being greater by a factor of at least 2 than the bending strength at the outwardly facing surface, b) the bonding surface of the outer sheet has the hydroxyl comprising surface topography produced by etching away the surface of the tempered outer sheet with a polishing acid, c) the bonding system consists of the protective layer on the hydroxyl comprising surface and a bonding layer which is compatible therewith and to which the bonding surface of the inner sheet is adhered, and d) the inner sheet, which may optionally be tempered, has, on the bonding surface and on the inwardly facing surface, bending strengths considerably less than the maximum bending strength at the bonding surface of the outer sheet.

The tempering may be thermal tempering in the case of a laminated glass window according to the invention for motor vehicles although preferably, the tempering of the outer sheet and the tempering of a tempered inner sheet are arranged as a chemical tempering.

Asymmetrical laminated glass windows are known per se, but for other purposes (DE-AS 17 04 824) or with quite different asymmetry conditions (US-PS 35 38 415). It is also known to give an individual chemically tempered glass sheet different bending strengths at its two surfaces, namely by fixing an elastic deformation (DE-OS 22 23 274), this glass sheet being adapted to be incorporated in a bond and there may be an after treatment which weakens the glass sheet. In the above-described known steps, the object underlying the present invention, relating to increasing impact strength, is not addressed.

In a further aspect therefore, the invention is based on the important discovery, for use of the laminated glass window as a vehicle window, more particularly a windscreen, that etching away the surface, which is carried out by means of a polishing acid sufficiently shortly after tempering, can be so performed as to establish asymmetrical bending strengths, namely a high bending strength being maintained at the etched surface as compared to the unetched surface. This and the virgin hydroxyl comprising surface topography can surprisingly be retained by the protective layer. Lamination with the pre-tempered inner sheet can easily be carried out thereafter. With regard to the surface topography and the tempering conditions in the outer sheet and in the laminated glass window as a whole the combination results in a high degree of asymmetry, even if the outer sheet and inner sheet are of equal thickness. The result of the fusion of the combination features a) to d) specified above in the laminated glass window is a complex state of stress, which is stable over the long term and even at elevated working and operating temperatures, and which gives the required impact resistance. In comparison with a basic window having (except for the features according to the invention) the same construction, the laminated glass window according to the invention has an increased integrated strength and, in particular, a considerably elevated impact stress in respect of impacts on the front (or outer) surface. However, in the event of impact stresses acting on the back (or inner) surface of the laminated glass window, the window nevertheless surprisingly breaks relatively easily. This is of great importance particularly for the use of laminated glass windows according to the invention in motor vehicles, where there is a likelihood of the driver's head colliding with the inner surface and this also applies to the compliance with existing standards, and also to other applications and uses.

Of course with a laminate glass window according to the invention the outer sheet and the inner sheet may be either of equal thickness or of different thicknesses. More particularly, it is possible to use float glass sheets of a total glass thickness of about 4 mm.

The production off such laminated windows according to the invention is a simple matter, this being a particular advantage of the invention. The outer sheet is tempered and immediately following this, etching away of the surface is carried out with a polishing acid, and immediately thereafter, after washing and drying treatment the protective layer is applied in the form of a solution of the protective layer substance to the virgin hydroxyl comprising surface topography of the surface in accordance with the method of the invention, and the heat treatment performed. The inner sheet is then connected with the interposition of a bonding film, to the surface provided with the protective layer. It is preferable to temper the inner sheet in the same way as the outer sheet, but to use it without any etching away and without a protective layer. In the final analysis, only a few additional steps are required and can be integrated without difficulty in a production line for the large scale manufacture of laminated windows, so that the laminated windows according to the invention are also suitable for mass production.

In any of the illustrated embodiments, it is within the scope of the invention to give the connecting sheet or the inner sheet—when constructed as glass sheets—or a glass sheet subsequently connected to the connecting sheet or inner sheet, a silanol comprising surface with an etched topography in the manner described, and to seal this surface with a protective layer as described, and to connect it to the respectively preceding sheet by way of a synthetic resin bonding system.

The invention will be described in greater detail below with reference to the following non-limiting Examples.

EXAMPLE 1

Table 1 shows the strength, in terms of the minimum, average and maximum bending strength, of eleven glass constructions having different processing methods. It will be seen that the initial float glass of construction 1 has low strength because of the defects in the surface. After etching, the strength is increased because of the removal of the defects, as shown in construction 2. For construction 3, the etched float glass has been interlayered by applying a film of PVB and then a laminate of glasses is formed which is heated in an autoclave under the specified temperature and pressure but anti-adhesive films have been put between the layers so as to prevent the layers adhering together. The PVB used in this construction, and in the other constructions of this Example, contained 17% plasticiser. The result of the interlayering of the etched glass surface with a PVB film is a marked reduction in the bending strength. This is because the PVB film mechanically damages the etched surface and this causes a reduction in strength. The reduction in strength is lower than would occur if the glass were heated to normally-used PVB laminating temperatures of around 140° C.

As shown in construction 4 which is in accordance with the present invention, the float glass sheet has been etched and had a 20 micron PVB protective coating applied thereto shortly, on the order of about 30 minutes, after washing and drying. It will be seen from construction 4 that the strength prior to lamination in an autoclave is greatly increased compared to the prior art construction 3. This is because the application of a protective layer from liquid PVB has avoided damage of the etched glass surface. Accordingly, the pre-product glass sheet construction 4 enables higher strength to be achieved by the application of a protective coating to the etched surface. After construction 4 has been pressed in an autoclave to form construction 5, it will be seen that the bending strength is reduced. This is because, as discused hereinabove, the lamination under pressure and at elevated temperature causes some of the water to be removed from the hydrated plasticised layer on the etched surface and this decreases the strength of the etched surface.

Construction 6 is similar to that of construction 4 except that the protective PVB coating has been applied substantially immediately, within about five minutes of the drying of the etched surface. This causes an increase in the bending strength as compared to construction 4 because the reduced time between drying and application of the protective layer reduces the possibility of mechanical damage and reduces degradation of the hydrated layer by the atmosphere. Construction 6 was also made in very clean conditions, in a dedusted room, and this has reduced the mechanical damage of the etched surface as compared construction 4. This leads to a consequential increase in the bending strength of the glass construction. Construction 7 comprises construction 6 but after pressing in an autoclave. It will be seen that the strength is reduced after the pressing but is reduced less as compared to constructions 4 and 5.

Construction 8 and 9 have been processed in the same manner as constructions 6 and 7 but additionally the glass sheet has been initially thermally tempered. This shows a greater increase in the bending strength prior to pressing and a reduced reduction in the bending strength after the pressing step. Constructions 10 and 11 have been processed the same way as constructions 6 and 7 but the glass sheet has initially being chemically tempered by an ion exchange process in order to strengthen it. This results in a reasonable strength of the construction after the pressing step.

EXAMPLE 2

A number of float-glass plates measuring 100×100×5 mm were dipped into an etching solution containing 20% HF and kept there until a surface glass layer of 100 microns in thickness was removed. The plates were then washed with water and dried in air at a temperature (t) of 65° C. for 30 minutes. The plates were then coated with a liquid solution of polyvinyl butyral (PVB) in alcohol. Different solutions were employed containing various amounts of plasticizer as listed in Table 2. The plasticiser used is available in commerce under the trade name A-17 from the Tasma factory of Khazan, Russian Federation. This provides an adhesive protective coating of PVB about 20–25 microns in thickness. The applied coating was heat-treated for 2 hours at a temperature of 20° or 150° C., as specified in Table 2.

Bending strength tests were performed on 20 test-pieces sampled from each lot by a double-ring test method in which the punch diameter was 20 mm and the support diameter was 40 mm. Apart from testing the strength, infra-red spectroscopic measurements were made for determining the content of the OH-groups and of molecular water in the coating. The OH-group content may be determined from the stretching vibrations in the range of 4320–3520 $cm^{-1}$ and the molecular water content may be determined from the deformation vibrations in the range of 1630–1650 $cm^{-1}$.

The average strength ($\overline{\sigma}$) of the glass plates after etching and the RMS deviation % of the strengths are given in Table 2.

Figure 5:
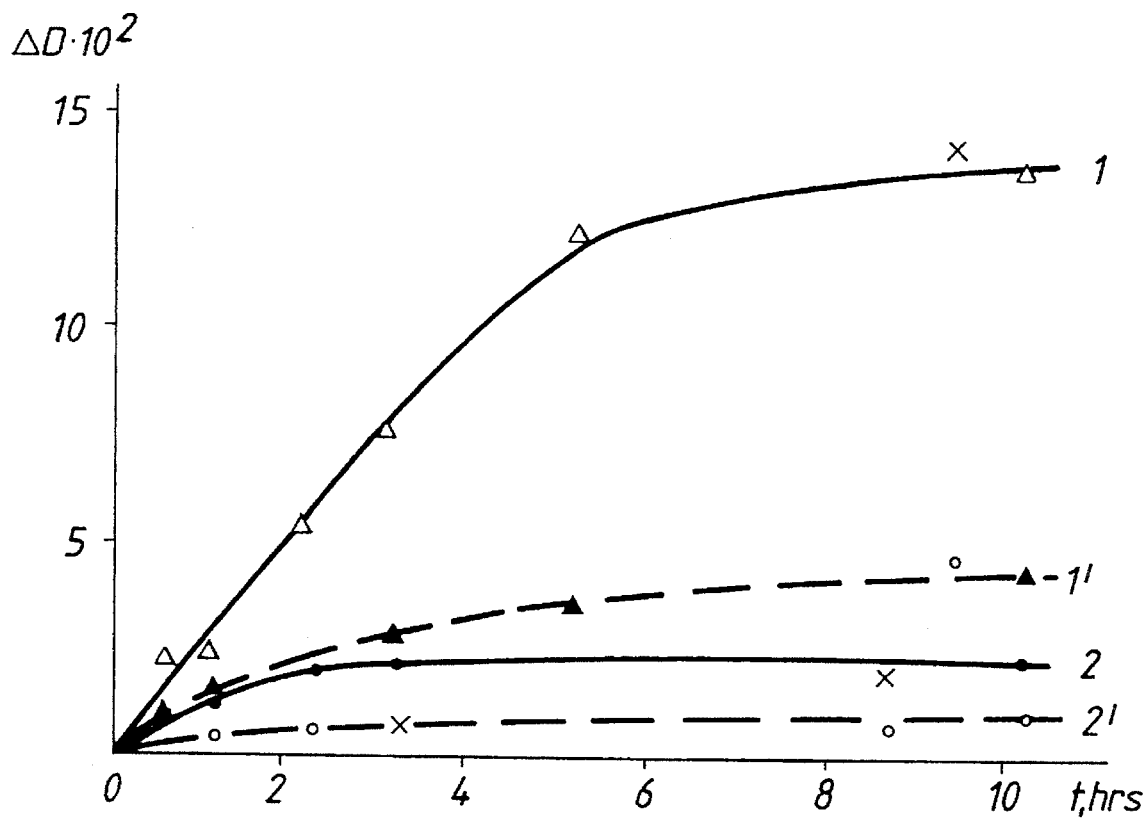
FIG. 5 is a graph showing the accumulation of water with time in a sub micron surfacial layer of a protective coating as measured by infra Red spectroscopy.

The data on the IR-spectroscopic measurements by multiple surface interval reflection of the accumulation of moisture in the superficial layer of the coating is shown in FIG. 5 which is a graph showing the variation of the vibrations detected ($\Delta\Delta$) with time.

It is evident from Table 2 that the maximum strength of the etched glass plates is attained after application of the plasticized PVB coatings. This is believed by the inventors to result from the plasticised coatings having a reduced moisture absorption as compared to the unplasticised coatings. Accordingly, with the plasticised coatings water is retained in the glass surface layer. This is supported by FIG. 5 which illustrates that for a PVB coating having no plasticiser (curves 1 and 1') there is rapid water take up by the coating as compared to a coating having 17% plasticiser (curves 2 and 2').

With the decrease in the plasticiser content in the coating and with the increase of the heat-treatment temperature, the strength becomes less which can be explained by the dehydration of the porous superficial layer. This can lead to a development of tensile stress in the glass surface, with the resultant formation of microcracks in the glass surface before and after loading. The plasticity of the surface layer of the glass as a result of dehydration thereof (i.e. removal of the hydroxy groups) causes the strength of the glass to decrease.

EXAMPLE 3

Float-glass plates measuring 60×60×1.3 mm were etched as in Example 2 to a depth of 120–150 microns, washed, dried and additionally optionally treated (before application of the coatings) in boiling water for 5 minutes to increase the quantity of the OH-groups in the superficial layer. The PVB coatings were applied as in Example 2 after allowing the glass plates to dry in air. Optional heat treatments for a period of 2 hours at 80, 100 or 150° C. were carried out as specified in Table 3.

Strength tests were conducted on a ring-type support with a diameter of 40 mm and a punch diameter of 6 mm. The average, maximum and minimum strengths ($\overline{\sigma\sigma}$ min and $\sigma$ max) of specified quantities of glass sheets were measured and the results are shown in Table 3.

It is evident from Table 3 that preliminary treatment of the uncoated etched glass in boiling water slightly increases its average strength, whereas the average strength after application of the PVB coating and the optional heat treatment is sharply reduced if the etched glass has been subjected to the boiling water treatment. This is presumably because the beneficial effect of the boiling water in hydrating the surface is lost on coating with PVB (the more so the lower the plasticiser content of the PVB) whilst physical damage resulting from the boiling water treatment remains. Thus, the quantity $\overline{\sigma}$ of the etched glass is reduced from around 2000 to around 900–1000 $N/mm^2$, $\sigma$ min is reduced from around 1600 to around 500 $N/mm^2$, and the RMS deviation increases from 6–10 to 20–34%. The maximum loss of the strength takes place after application of the PVB coating without the plasticizer since this coating is characterized by a much higher concentration of the OH-groups, as compared with the other coatings, which function as water absorption centres. As a result, as is clear from FIG. 5, the PVB coating with no plasticiser absorbs an amount of water which is several times higher than the amounts of water absorbed by the other coatings and destroys the hydrated superficial layer of the etched glass.

EXAMPLE 4

A polyurethane (PU) coating comprising a 70% solution of the adduct of trimethylolpropane and toluenediisocyanate (1:3) in ethyl acetate was applied to the glass plates similar to the plates described in Example 3 after they have been etched, washed and dried under the same conditions. The adduct in the initial state contains isocyanate groups capable of fast interaction with water. It has been established that this coating, in the process of its chemical formation on the glass surface, chemically binds the water adsorbed on the glass. The coating thickness was 30 microns.

The results are shown in Table 4. It will be seen that the glass strength is higher with no heat treatment. It is believed that this is because with no heat treatment there is a reduced extraction of water from the glass surface by the polyurethane coating.

EXAMPLE 5

After the float-glass plates were etched, washed and dried as described in Example 4, a 1% adhesive solution in a solvent mixture of methylethylketone and acetone of a polyurethane varnish on the basis of polyoxytetra-methylene glycol (molecular weight M=1000) and toluene-diisocyanate with addition of gamma- aminopropyltriethoxy silane (0.15% by mass) was applied to the glass surface. After drying the coating in air for 2–3 minutes, a 20% solution of the polyurethane varnish in methylethylketone and acetone was applied until the coating thickness was 30 microns. The glass sheets were then heat treated at 80° C. or 150° C. for two hours. The data on the strength of the etched glass plates with the PU coating are given in Table 5.

It will be seen that the heat treatment at 80° C. provides higher strength glass than the heat treatment at 150° C.

EXAMPLE 6

This invention illustrates the use of a two layer protective coating. Glass plates measuring 60×60×1.3 mm were etched in 20% HF, washed and dried in air, after which a silicone coating was applied to the surface to provide a coating thickness of 2 microns. The coating was applied from a 16-% solution in toluene of polydimethyl-γ-aminopropylphenyl-alkoxysilazane.

After hardening of this coating, a second layer of the polyurethane coating, grade UR-177, available in commerce from RPS Research and Production Society, Sdectr LK, Moscow, Russia was applied until the coating thickness was 7–10 microns. This coating was produced from a two-component system being a mixture of hydroxyl-containing polyesters and polyisocyanatebiuret (the ratio of NCO/OH is 1:1) as a hardener in cyclohexanone. The data on the strength of the etched glass plates with the silicone coating (the first layer) and polyurethane coating (the 2nd layer) are given in Table 6.

EXAMPLE 7

Float-glass plates measuring 500×500 mm, with a thickness of 3–6 mm, were etched, as in Example 6, and, after application and heat-treatment of PVB-17% plasticiser coatings, 20 microns thick, were bonded together by an interlayer of the same material of the coating 0.5–1 mm in thickness. A protective polyurethane plate, 2.5 mm in thickness ($\epsilon=360\%$, $\sigma=38$ N/mm$^2$) was simultaneously bonded to the inner surface of the glass unit by the polyurethane adhesive coating used in Example 5.

The glass units manufactured by this method were tested for bullet-proofness by firing at the corners of an equilateral triangle with bullets of various calibers (the distance between the triangle corners was approximately 120 mm). The test results are given in Table 7.

The mass of the laminates made using glass plates strengthened in accordance with the present invention was around 1.3–1.5 times less than the mass of the known glass-polymer compositions with similar bullet resistance.

EXAMPLE 8

Float-glass plates measuring 500×500 mm, with thickness from 3 to 12 mm, were etched and coated by a protective coating bonded by plasticized PVB film, 0.38 mm in thickness, with each other and with non-etched outer plates and bonded by the same film, 1.5 mm in thickness, with an inner glass plate hardened by ion-exchange to a depth of 30 microns.

The dynamic effect test conditions were similar to the conditions of Example 7. The test results are given in Table 8.

The mass of the compositions manufactured with the use of several glass plates made in accordance with the invention is 1.2–1.3 times less than the mass of the known laminated glass compositions with similar bullet resistance.

EXAMPLE 9

To determine the efficiency of the use of glass plates made in accordance with the invention in a bird-proof windshield of an aircraft, there were manufactured laminated glass units measuring 690×510 mm, with employment of float-glass hardened by various methods as a middle plate of the glass unit. The total thickness of the bonded glass units was 25–28 mm. The bonding layer was polyvinylbutyral (the modulus of elasticity $\epsilon=1000$ N/mm$^2$, Poisson's ratio M=0.46, the breaking strength −21 N/mm$^2$, elongation $\epsilon=160\%$) The inner plates were polyurethaneacrylate (PUA) ($\epsilon=360\%$, E=3300 N/mm$^2$, $\sigma=38$ N/mm$^2$), oriented methyl methacrylate (MMA), and 3-mm float-glass chemically tempered by ion-exchange ($\sigma=300$ N/mm$^2$).

The bird-impact tests were conducted with the use of a bird having a mass of 1.8 kg and the angle of the bird impact with the glass unit was 38°–40°. The test results are given in Table 9.

EXAMPLE 10

The previous Examples give the results of the tests of laminated glass units bonded with the use of the PVB films and shows the efficiency of protection of the high-strength etched glass in accordance with the invention by the polymer films made with a rear pane of polyurethane or acrylate material which considerably improves the bullet-proof resistance and bird-impact resistance of the units (Examples 8 and 9).

This Example shows the results of tests of the etched glass panels bonded to each other and protected on the inside of the laminated unit by polyurethane.

The glass dimensions were 750×750 mm. The inner glass panels were hardened in several stages: intensive hardening ($\sigma$=300–400 N/mm$^2$), additional etching in hydrofluoric acid solutions to a depth of 100–150 microns and application of the protective adhesive coatings on the basis of PVB and PU, 15–20 microns thick, compatible with the bonding layers. The coatings were heat-treated in a dedusted chamber at a temperature of not over 100° C. The strength of such glass panels was 1500–2000 N/mm$^2$.

After heat-treatment of the coatings, the glass panels were bonded in the autoclave in accordance with known practice.

The results of the bird-impact tests of the etched glass panels bonded with the use of the PU film and protected on the inside by a layer made of the polyurethane materials are given in Table 10 in comparison with similar compositions made of the glass plates hardened by the conventional methods.

The data given in Examples 9 and 10 show that the use of the etched glass panels in accordance with the invention for manufacture of the bird-proof windshields for aircraft provides for the decrease of the mass of the glass units by 1.5–2 times, with preservation of their protective properties.

EXAMPLE 11

Two lots of the float-glass plates, each lot containing 10 plates with a thickness of 2.3 mm (outer glass) and 1.3 mm (inner glass), measuring 300×300 mm, were hardened by ion-exchange in a KNO$_3$ solution at a temperature of 480° C. for 24 hours.

After washing and drying these glass plates, the internal surface of the outer glass plate was treated in a mixture of solutions HF and H$_2$SO$_4$ (2 parts of 40% HF, 0.5 parts of 50% H$_2$SO$_4$ and 1.5 parts of H$_2$O) which removed a glass surface layer 5–7 microns in thickness. After subsequent washing and drying of the outer glass plate a 7% solution of polyvinylbutyral (PVB-17% plasticiser) was applied to its internal surface until the coating thickness was 3 microns. Then the coating was heat-treated at 80° C. for 2 hours after which a PVB film 0.76 mm in thickness was placed in-between the outer and inner glass plates and the plates were bonded under the conditions typically used for bonding motor car laminated glass units. The bonded glass plates were tested for impact by a steel ball with a mass of 236 g in accordance with known procedures. The ball dropping height was 9 m. After performance of the tests, none of 10 tested bonded glass units was found to be broken. For comparison, it should be noted that if the protective coating was not applied to the internal surface of the outer glass before bonding of the similar hardened glass plates, the impact would cause the breakage of the outer and inner glass plates, but the bonding film would remain intact, holding together the fragments of the inner glass plate.

TABLE 1

| Method of processing | Strength | | N/mm$^2$ |
|---|---|---|---|
| 100 × 100 × 5 mm plates | $\sigma$min | $\overline{\sigma}$ | $\sigma$max |
| 1. Original float-glass | 40 | 140 | 430 |
| 2. Original float-glass with etching | 200 | 860 | 1020 |
| 3. Original float-glass with etching after interlaying PVB-film and pressing the stack (t = 100° C.; p = 16 atm) of glasses with interlayed anti-adhesive films in auto-clave | 120 | 420 | 730 |
| 4. Etching & applying PVB-protective coating (20 μm) before laminating in auto-clave | 600 | 1600 | 2020 |
| 5. Etching & applying PVB-protective coating (20 μm) before laminating in auto-clave & after pressing | 240 | 700 | 1450 |
| 6. Etching & application of PVB-protective coating (20 μm) immediately after washing and drying | 1300 | 2020 | 2400 |
| 7. As 6 with additional final pressing | 950 | 1750 | 2100 |
| 8. Etching & application of PVB-protective coating (20 μm) immediately after washing and drying with initial thermal tempering | 1600 | 2300 | 2650 |
| 8a. Original thermally tempered float glass | 220 | 350 | 460 |
| 9. As 8 with additional final pressing | 1350 | 2150 | 2300 |
| 10. Modified etching & application of PVB-protective coating (20 μm) immediately after washing and drying with initial chemical tempering by ion-exchange | 850 | 1350 | 1500 |
| 11. As 10 with additional final pressing | 800 | 1250 | 1400 |

TABLE 2

| Type of coating | Plasticizer content, % | Heat-treatment | $\overline{\sigma}$ N/mm$^2$ | RMS deviation, % |
|---|---|---|---|---|
| PVB | 0 | 20° C., 2 hours | 1500 | 28 |
| | | 150° C., 2 hours | 1100 | 34 |
| | 10 | 20° C., 2 hours | 1700 | 21 |
| | | 150° C., 2 hours | 1600 | 28 |
| | 17 | 20° C., 2 hours | 2100 | 10 |
| | | 150° C., 2 hours | 1900 | 13 |

TABLE 3

| Protective coating | Surface treatment | Heat treatment | σ N/mm² | σmin N/mm² | σmax N/mm² | Quantity of test-pieces |
|---|---|---|---|---|---|---|
| Without coating | Etching in HF | — | 2030 | 1600 | 2150 | 53 |
| | Same + boiling in water for 5 min | — | 2070 | 1350 | 2420 | 69 |
| PVB-17% plasticiser | Etching in HF | — | 2030 | 1500 | 2250 | 15 |
| | Same + boiling in water for 5 min | — | 1530 | 780 | 2600 | 20 |
| | Etching in HF | 80° C. 2 h | 2000 | 1600 | 2150 | 18 |
| | Same + boiling in water for 5 min | 80° C. 2 h | 1680 | 1230 | 2200 | 15 |
| PVB-10% plasticiser | Etching in HF | 100° C. 2 h | 1630 | 780 | 2000 | 18 |
| | Same + boiling in water for 5 min | 100° C. 2 h | 980 | 730 | 1650 | 14 |
| PVB-No plasticiser | Etching in HF | 150° C. 2 h | 1160 | 780 | 1600 | 17 |
| | Same + boiling in water for 5 min | 150° C. 2 h | 870 | 500 | 1130 | 15 |

TABLE 4

| Protective coating | Surface treatment | Heat treatment | σ N/mm² | σmin N/mm² | σmax N/mm² | Quantity of test-pieces |
|---|---|---|---|---|---|---|
| Polyurethane | Etching in HF | — | 2150 | 1800 | 2250 | 15 |
| | Same | 80° C. 2 h | 2010 | 1700 | 2200 | 9 |
| | Same | 150° C. 2 h | 1130 | 850 | 1580 | 7 |

TABLE 5

| Protective coating | Surface treatment | Heat treatment | σ N/mm² | σmin N/mm² | σmax N/mm² | Quantity of test-pieces |
|---|---|---|---|---|---|---|
| PU | Etching in HF | 80° C. 2 h | 2330 | 1600 | 2610 | 15 |
| | | 150° C. 2 h | 1740 | 1180 | 2240 | 15 |

TABLE 6

| Protective coating | Surface treatment | Heat treatment | Strength σ, N/mm² | | | Quantity of test-pieces |
|---|---|---|---|---|---|---|
| | | | σ | σmin | σmax | |
| Silicone coating (1st layer) Polyurethane coating (2nd layer) | Etching in HF | 80° C. 2 h | 2450 | 2200 | 2640 | 15 |
| | | 150° C. 2 h | 1560 | 1200 | 1990 | 15 |

TABLE 7

| Glass unit thickness, mm | Mass kg/m² | Kind of weapon | Distance m | Number of shots | Result | Quantity of non-broken inner plates |
|---|---|---|---|---|---|---|
| 11 | 19 | 9 mm Makarov's pistol | 3 | 3 | Spall-free No fragments | 0 |
| 18 | 35 | 9 mm Pistol (DIN C-1) | 3 (100 × 100 × 125) | 3 | Spall-free No fragments | 0 |
| 25 | 51 | 44 Magnum (DIN C-3) | 3 | 3 | Spall-free No fragments | 0 |
| 32 | 68 | 44 Magnum (DIN C-3) | 3 | 3 | Spall-free No fragments | 2 |
| 36 | 78 | 7.62 Nato Ball (DIN C-4) | 10 | 3 | Spall-free No fragments | 2 |
| 38 | 83 | 7.62 Nato AP (DIN C-5) | 25 | 1 | Spall-free No fragments | 0 |
| 55 | 125 | 7.62 Nato AP (DIN C-5) | 25 | 3 | Spall-free No fragments | 0 |

TABLE 8

| Glass unit thickness, mm | Mass kg/m² | Quantity of plates in unit | Quantity of high-strength plates in unit | Kind of Weapon | Number of shots | Quantity of non-broken inner plates |
|---|---|---|---|---|---|---|
| 19 | 43 | 4 | 1 | TT | 3 (100 × 120 × 100) | 2 |
| 40 | 97 | 5 | 2 | AKM-47 Steel Core | 3 (120 × 120 × 120) | 3 |
| 53 | 133 | 5 | 2 | G3-WK (C-4) | 3 (120 × 130 × 120) | 3 |

TABLE 9

| No. | COMPOSITION Outer glass mm | Middle glass mm | Inner plate mm | Total thickness, mm | Mass kg/m$^2$ | Angle of impact, deg. (relative to horizon) | Bird speed km/h | Result | Remark |
|---|---|---|---|---|---|---|---|---|---|
| 1 | 3 | 12 Thermally tempered ($\sigma$comp = 120 N/mm$^2$ + etched as invention + plastification ($\sigma$ = 1500–2200 N/mm$^2$) | 5 PUA | 23 | 47 | 40 | 617 | Outer glass broken | First shot |
|   |   |   |   |   |   |   | 715 | Both glass panels broken, inner plate intact | Second shot |
| 2. | 3 | 12 Thermally tempered ($\sigma$comp = 120N/mm$^2$) + etched as invention + plastification ($\sigma$ = 1500–2200 N/mm$^2$) | 5 PUA | 23 | 47 | 40 | 653 | Outer glass broken | First shot |
|   |   |   |   |   |   |   | 750 | Both glass panels broken, inner plate intact | Second shot |
| 3 | 5 | 12 Thermally tempered ($\sigma$comp = 120 N/mm$^2$) + etched as invention + plastification ($\sigma$ = 1500–2200 N/mm$^2$) | 5 MMA oriented | 26 | 53 | 40 | 605 | Outer glass broken | First shot |
|   |   |   |   |   |   |   | 715 | Outer glass broken | Second shot |
|   |   |   |   |   |   |   | 775 | Outer glass broken | Third shot |
| 4. | 5 | 12 Chemically tempered by Ion-exchange ($\sigma$= 300 N/mm$^2$ | 3 | 25 | 56 | 40 | 720 | Outer glass broken | First shot |
|   |   |   |   |   |   |   | 780 | Outer glass & inner plate (3 mm) broken middle glass (12 mm) intact | Second shot |
| 5. | 5 | 8 Thermally tempered | 12 Thermally tempered | 30 | 68 | 38 | 520 | Outer glass broken | First shot |
|   |   |   |   |   |   |   | 550 | All glass panels broken | Second shot |
| 6. | 3 | 12 Chemically tempered by ion-exchange ($\sigma$ = 400 N/mm$^2$ | 4 Chemically tempered by ion-exchange ($\sigma$ = 300 N/mm$^2$ | 30 | 57 | 38 | 630 | Outer glass broken | First shot |
|   |   |   |   |   |   |   | 670 | All glass panels | Second shot broken |

TABLE 10

| No. | COMPOSITION Outer glass mm | Middle glass mm | Inner glass mm | Inner layer mm | Total thickness, mm | Mass kg/m$^2$ | Angle of impact, deg. | Bird speed km/h | Result | Remark |
|---|---|---|---|---|---|---|---|---|---|---|
| 1. | 5 | 12 Thermally tempered ($\sigma$comp = 160 N/mm$^2$) | 15 Thermally tempered ($\sigma$comp = 180 N/mm$^2$) | — | 37 | 86 | 43 | 540 | Outer glass broken (first shot) | Glass units measuring 700 × 300 mm |
|  |  |  |  |  |  |  |  | 600 | All glass panels broken (3rd shot) |  |
| 2. | 5 | 10 ($\sigma$comp = 140 N/mm$^2$) | 20 ($\sigma$comp = 140 N/mm$^2$) | — | 40 | 98 | 45 | 680 | Outer glass broken | Glass units of 1200 × 800 mm |
|  |  |  |  |  |  |  |  | 730 | All glass panels broken |  |
| 3. | 3 | 10 Thermally tempered ($\sigma$comp = 250 N/mm$^2$) | 5 Thermally tempered ($\sigma$comp = 170 N/mm$^2$) | 3 PU | 26 | 53 | 45 | 670 | Outer and middle glass panels broken |  |
| 4. | 3 | 5 Thermally tempered ($\sigma$comp = 170 N/mm$^2$) | 10 Thermally tempered ($\sigma$comp = 250 N/mm$^2$) | 3 PU | 26 | 53 | 45 | 665 | Outer glass glass |  |
| 5. | 3 | 5 Thermally tempered ($\sigma$comp = 170 N/mm$^2$) | 8 Thermally tempered ($\sigma$comp = 210 N/mm$^2$) | 3 PU | 24 | 48 | 45 | 680 | Outer and middle glass panels broken |  |
| 6. | 3 | 8 | 5 | 3 PU | 24 | 48 | 45 | 670 | Outer and middle glass panels broken |  |
| 7. | 3 | 6 ($\sigma$comp = 200 N/mm$^2$) | 6 ($\sigma$comp = 200 N/mm$^2$) | 3 PU | 25 | 45 | 43 | 670 | Outer glass broken |  |
| 8. | 3 | 6 ($\sigma$comp = 200 N/mm$^2$) | 6 ($\sigma$comp = 200 N/mm$^2$) | 3 PU | 25 | 45 | 43 | 677 | Outer glass broken |  |
| 9. | 3 | 6 ($\sigma$comp = 200 N/mm$^2$) | 6 ($\sigma$comp = 200 N/mm$^2$) | 3 PU | 25 | 45 | 43 | 720 | Outer glass broken |  |
| 10. | 3 | 5 | 5 | 3 | 23 | 40 | 43 | 670 | Outer and middle glass panels broken |  |

What we claim is:

1. A method of producing a pre-product glass sheet from a tempered or non-tempered glass sheet substrate, which, acting as a component which increases the impact strength of a laminated glass window having at least one synthetic resin bonding layer, is adapted to be integrated into said laminated glass window, the method comprising the steps of:

(a) etching at least one face of the glass sheet substrate to produce a virgin surface which comprises silanol groups;

(b) cleaning the virgin etched surface by washing;

(c) removing mobile water from the cleaned virgin surface by a drying treatment, the silanol groups being retained; and (d) applying a protective layer to the dried surface which adheres firmly to the surface, the protective layer being composed of a plastics material which is adapted to be compatibly adherable to a synthetic resin bonding interlayer.

2. A method according to claim 1 wherein step (a) comprises etching at least one face of the glass sheet substrate to remove micro-cracks and to produce a virgin surface layer which comprises a hydrated surface layer including silanol groups and step (c) comprises removing mobile water from the cleaned etched surface by a drying treatment, the hydrated surface layer being retained.

3. A method according to claim 1, further comprising after step (d) the step of heating the pre-product glass sheet so as to adjust the strength of the pre-product glass sheet while retaining the silanol groups.

4. A method according to claim 3, wherein the steps from the etching step to the heat treatment step are carried out one after the other without interruption.

5. A method according to claim 3, wherein the drying treatment and the heat treatment of the pre-product glass sheet are carried out at a temperature of less than 200° C.

6. A method according to claim 3, wherein the drying treatment and the heat treatment of the pre-product glass sheet are carried out at a temperature of less than 120° C.

7. A method according to claim 3, wherein the drying treatment and the heat treatment are performed in a dust-free environment.

8. A method according to claim 1, wherein the protective layer comprises a polyvinyl butyral layer, a polyurethane layer or a composite layer of an amino organo silicone layer and a polyurethane layer.

9. A method according to claim 1, wherein the protective layer is applied from a film forming solution, deposited onto the etched surface preferably by flow, spray or dip coating.

10. A method according to claim 1, wherein the protective layer has a thickness of from 0.5 to 50 microns.

11. A method according to claim 1, wherein the etching step removes a thickness of from 3 to 300 microns of glass.

* * * * *